United States Patent
Gonze et al.

(10) Patent No.: US 8,347,607 B2
(45) Date of Patent: Jan. 8, 2013

(54) INTEGRATED EXHAUST AND ELECTRICALLY HEATED PARTICULATE FILTER REGENERATION SYSTEMS

(75) Inventors: Eugene V. Gonze, Pinckney, MI (US); Michael J. Paratore, Jr., Howell, MI (US)

(73) Assignee: GM Global Technology Operations LLC

( * ) Notice: Subject to any disclaimer, the term of this patent is extended or adjusted under 35 U.S.C. 154(b) by 578 days.

(21) Appl. No.: 12/358,672

(22) Filed: Jan. 23, 2009

(65) Prior Publication Data

US 2010/0186384 A1    Jul. 29, 2010

(51) Int. Cl.
*F01N 3/00* (2006.01)
(52) U.S. Cl. ........... 60/286; 60/274; 60/295; 60/297; 60/300; 60/311
(58) Field of Classification Search .......... 60/274, 60/285, 286, 295, 297, 300, 303, 311
See application file for complete search history.

(56) References Cited

U.S. PATENT DOCUMENTS

| | | | | |
|---|---|---|---|---|
| 4,505,107 A | * | 3/1985 | Yamaguchi et al. | 60/303 |
| 4,685,290 A | * | 8/1987 | Kamiya et al. | 60/274 |
| 5,388,406 A | * | 2/1995 | Takeshima et al. | 60/297 |
| 5,551,971 A | * | 9/1996 | Chadderton et al. | 95/15 |
| 6,032,461 A | * | 3/2000 | Kinugasa et al. | 60/295 |
| 6,090,172 A | * | 7/2000 | Dementhon et al. | 55/282.3 |
| 7,104,051 B2 | * | 9/2006 | Shimasaki et al. | 60/297 |
| 7,628,011 B2 | * | 12/2009 | Crawley et al. | 60/295 |
| 7,886,529 B2 | * | 2/2011 | Gonze et al. | 60/295 |
| 2007/0266701 A1 | * | 11/2007 | Cheng | 60/295 |

FOREIGN PATENT DOCUMENTS

| | | |
|---|---|---|
| DE | 3529684 A1 | 2/1987 |
| DE | 60303250 T2 | 7/2006 |
| DE | 102007025419 A1 | 12/2008 |
| EP | 1426592 A2 | 9/2004 |

OTHER PUBLICATIONS

German Office Action, dated Jul. 8, 2011, for Application No. 102010005179.9, 6 pages.
U.S. Appl. No. 11/950,545, filed Dec. 5, 2007, Eugene V. Gonze.
U.S. Appl. No. 12/174,069, filed Jul. 16, 2008, Eugene V. Gonze.

* cited by examiner

*Primary Examiner* — Binh Q Tran

(57) ABSTRACT

A system includes a particulate matter (PM) filter that includes multiple zones. An electrical heater includes heater segments that are associated with respective ones of the zones. The electrical heater is arranged upstream from and proximate with the PM filter. A post-fuel injection system injects fuel into at least one of a cylinder of an engine and an exhaust system. A control module is configured to operate in a first mode that includes activating the electrical heater to heat exhaust of the engine. The control module is also configured to operate in a second mode that includes activating the post-injection system to heat the exhaust. The control module selectively operates in at least one of the first mode and the second mode.

20 Claims, 8 Drawing Sheets

INTEGRATED EXHAUST AND ELECTRICALLY HEATED PARTICULATE FILTER REGENERATION SYSTEMS

STATEMENT OF GOVERNMENT RIGHTS

This disclosure was produced pursuant to U.S. Government Contract No. DE-FC-04-03 AL67635 with the Department of Energy (DoE). The U.S. Government has certain rights in this disclosure.

FIELD

The present disclosure relates to engine control systems for internal combustion engines, and more particularly to particulate filter regeneration systems.

BACKGROUND

The statements in this section merely provide background information related to the present disclosure and may not constitute prior art.

Engines such as diesel engines produce particulate matter (PM) that is filtered from exhaust gas by a PM filter. The PM filter is disposed in an exhaust system of the engine. The PM filter reduces emission of PM that is generated during combustion.

Over time, the PM filter becomes full. During regeneration, the PM may be burned within the PM filter. Regeneration may involve heating the PM filter to a combustion temperature of the PM. There are various ways to perform regeneration including modifying engine management, using a fuel burner, using a catalytic oxidizer to increase the exhaust temperature with after injection of fuel, using resistive heating coils, and/ or using microwave energy. The resistive heating coils are typically arranged in contact with the PM filter to allow heating by both conduction and convection.

Regeneration may be performed using an exhaust heating technique or using an electrical heating technique. An exhaust heating technique refers to the heating of an exhaust gas, for example, by post injection of fuel. During a combustion cycle of an engine, an air/fuel mixture is compressed and ignited within a cylinder of the engine. To facilitate regeneration, fuel may be injected into the cylinder during the combustion cycle and after ignition of the air/fuel mixture or into the exhaust stream. When introduced during or after ignition and/or exhaust strokes of the combustion cycle, the injected fuel, referred to as post-injected (PI) fuel, mixes with the exhaust gas and is oxidized by an oxidation catalyst disposed in the exhaust system. The heat released from the oxidation reaction in the catalyst increases the temperature of the exhaust system, which facilitates the ignition of the particulates in the PM filter.

The electrical heating technique refers to the electrical heating of an exhaust gas entering a PM filter. One or more electrical coils may be disposed upstream from the PM filter and may be activated to heat the exhaust gas. This provides a quick heating and light off of the PM.

PM reduction systems that use fuel tend to decrease fuel economy. For example, many fuel-based PM reduction systems decrease fuel economy by 5%. Electrically heated PM reduction systems reduce fuel economy by a negligible amount, but are operation-limited based on exhaust flow. As exhaust flow increases, for example, above a particular flow rate (kg/s), the facilitation and ability to initiate regeneration by an electrically heated element decreases.

SUMMARY

In one embodiment, a system is provided that includes a particulate matter (PM) filter that includes multiple zones. An electrical heater includes heater segments that are associated with respective ones of the zones. The electrical heater is arranged upstream from and proximate with the PM filter. A post-fuel injection system injects fuel into at least one of a cylinder of an engine and an exhaust system. A control module is configured to operate in a first mode that includes activating the electrical heater to heat exhaust of the engine. The control module is also configured to operate in a second mode that includes activating the post-injection system to heat the exhaust. The control module selectively operates in at least one of the first mode and the second mode.

In other features, a method is provided that includes providing a particulate matter (PM) filter that includes a plurality of zones. A regeneration system is provided that is configured to operate in a first mode that includes activating an electrical heater to heat exhaust of an engine. The regeneration system is also configured to operate in a second mode that includes activating a post-injection system to heat the exhaust. The electrical heater includes heater segments, which each correspond with a respective one of the zones. The electrical heater is arranged upstream from and proximate with the PM filter. The exhaust of the engine is heated by selectively operating the regeneration system in at least one of the first mode and the second mode.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
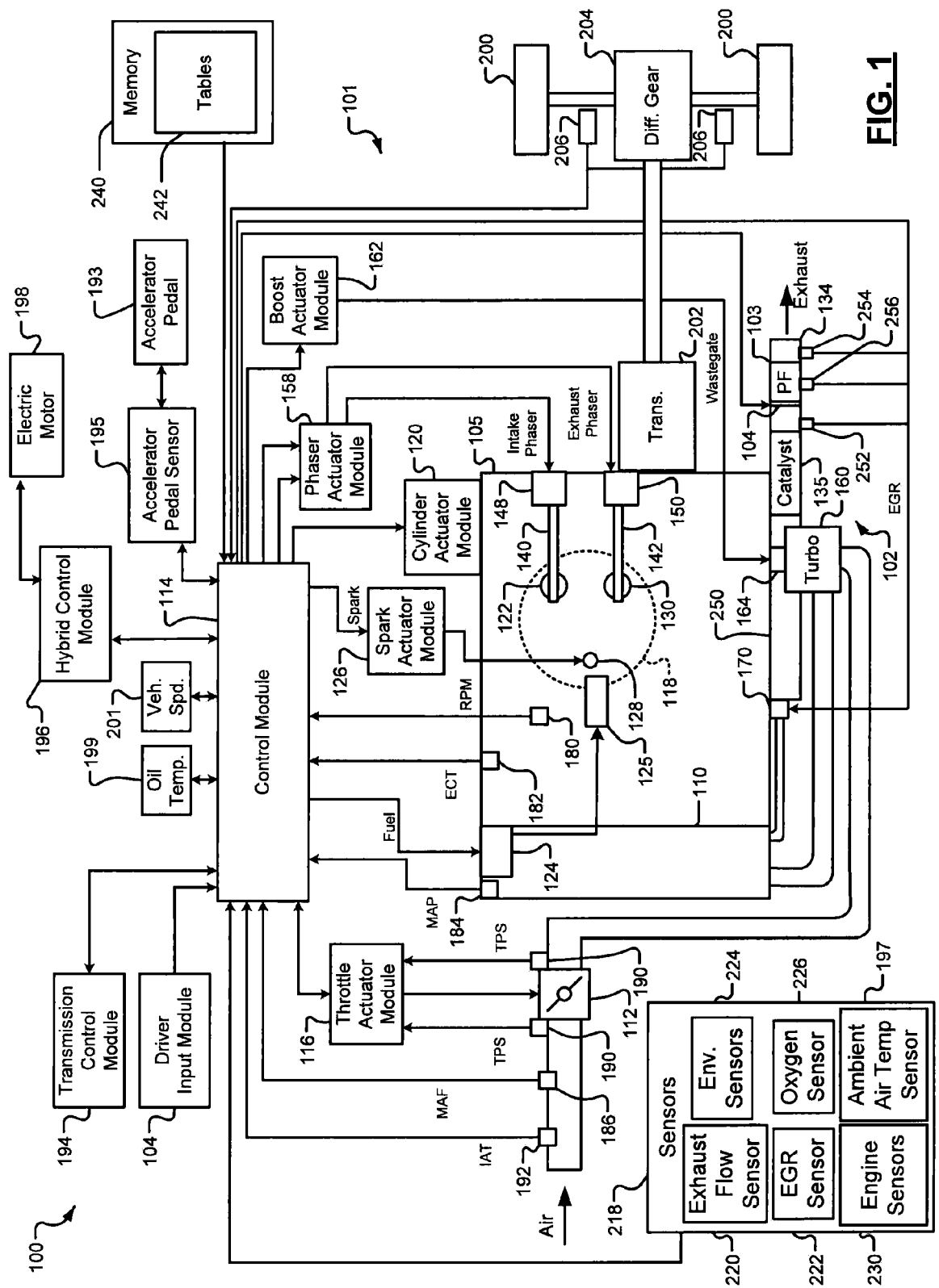
FIG. 1 is a functional block diagram of an engine system in accordance with an embodiment of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

In addition, although the following embodiments are described primarily with respect to example internal combustion engines, the embodiments of the present disclosure may apply to other engines. For example, the present invention may apply to compression ignition, spark ignition, spark ignition direct injection, homogenous spark ignition, homogeneous charge compression ignition, stratified spark ignition, diesel, and spark assisted compression ignition engines.

In addition, in the following description terms, such as "first", "second", and "third" are used. These terms are not specific to any one device or element. More than one of the terms may be used to refer to the same device depending upon the context. For example, the terms first and second may be used to refer to the same module.

Furthermore, various sensors and parameters are disclosed herein. The parameters may be directly determined based on signals from the corresponding sensors or may be indirectly determined. When indirectly determined, the parameters may be based on signals from non-corresponding sensors, based on determined engine and/or exhaust system operating conditions, and/or based on predetermined values. For example, air flow across an external area of an exhaust system may be directly determined via an air flow sensor or may be estimated based on information from a vehicle speed sensor and/or other sensors.

The use of an electrically heated particulate filter (PF) is an efficient technique for regenerating a PF. An electrically heated PF may be used to divide regeneration of a PF into zones, which permits fast regeneration using soot as fuel without damaging the PF. An electrically heated PF may be regenerated in less than 5 minutes, compared to 20-30 minutes for exhaust heated regeneration techniques, such as post fuel injection techniques. High exhaust flow rates limit the operating range in which an electrically heated PF is effective for regeneration. Exhaust heated PF techniques, such as post fuel injection, may be used to perform regeneration during high exhaust flow rates. The embodiments described provide techniques for performing regeneration for a wide range of exhaust flow rates.

Referring now to FIG. 1, an engine system 100 that incorporates a regeneration system 101 that performs both post fuel injection and electrically heated PF regeneration is shown. Although the following embodiment is directed to a hybrid vehicle, the embodiments disclosed herein may be applied to non-hybrid vehicles. The engine system includes an exhaust system 102, which includes the regeneration system 101. The regeneration system 101 is used to remove particulates in a PF 103 of the exhaust system 102. The regeneration system regenerates the PF 103 by performing post fuel injection and/or by electrically heating exhaust and/or an upstream portion of the PF 103. A heater assembly 104 is located upstream of the PF 103 and may be activated to initiate regeneration.

The engine system 100 includes an engine 105 that combusts an air/fuel mixture to produce drive torque for a vehicle based on a driver input module 104. Air is drawn into an intake manifold 110 through a throttle valve 112. A control module 114, which may be referred to as an engine control module, commands a throttle actuator module 116 to regulate opening of the throttle valve 112 to control the amount of air drawn into the intake manifold 110. The engine system 10 and/or the control module 114 may include one or more of the modules of FIG. 2.

Air from the intake manifold 110 is drawn into the cylinder 118 through an intake valve 122. The control module 114 controls the amount, timing, and number of fuel injections into each cylinder of the engine 105 and during a combustion cycle via a fuel injection system 124 that includes one or more fuel injectors 125. A combustion cycle may refer to an intake stroke, a compression stroke, an ignition stroke and an exhaust stroke of a cylinder. The fuel injection system 124 may inject fuel into the intake manifold 110 at a central location or may inject fuel into the intake manifold 110 at multiple locations, such as near the intake valve of each of the cylinders. Alternatively, the fuel injection system 124 may inject fuel directly into the cylinders, as shown.

The fuel that is injected prior to an ignition stroke with the air and creates the air/fuel mixture in the cylinder 118. A piston (not shown) within the cylinder 118 compresses the air/fuel mixture. Based upon a signal from the control module 114, a spark actuator module 126 energizes a spark plug 128 in the cylinder 118, which ignites the air/fuel mixture. The timing of the spark may be specified relative to the time when the piston is at its topmost position, referred to as to top dead center (TDC), the point at which the air/fuel mixture is most compressed. The fuel (post-injected fuel) that is injected during or after an ignition stroke mixes with, for example, exhaust gas in the respective cylinder and is released into the exhaust system 134.

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134. Exhaust passes through an oxidation catalyst 135 and the PF 103. The embodiments disclosed herein may be applied to an aftertreatment system that includes an oxidation catalyst, a particulate filter, and/or other catalyst and aftertreatment components.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 120 may deactivate cylinders by halting provision of fuel and spark and/or disabling their exhaust and/or intake valves.

A control module 114 may regulate the position of the intake valve 122 and/or the exhaust valve 130 to increase the quantity of fuel ingested into the cylinder(s) 118. The control module 114 may also adjust operation of the fuel injector(s) 125, such as ON time or size of injector openings, to increase the amount of fuel injected into the cylinder(s) 118. The control module 114 may also adjust the timing of the exhaust camshaft(s) corresponding to the change in the A/F mixture.

The time at which the intake valve 122 is opened may be varied with respect to piston TDC by an intake cam phasor 148. The time at which the exhaust valve 130 is opened may be varied with respect to piston TDC by an exhaust cam phasor 150. A phasor actuator module 158 controls the intake cam phasor 148 and the exhaust cam phasor 150 based on signals from the control module 114.

The control system 100 may include a boost device that provides pressurized air to the intake manifold 110. For example, FIG. 1 depicts a turbocharger 160. The turbocharger 160 is powered by exhaust gases flowing through the exhaust system 134, and provides a compressed air charge to the intake manifold 110. The turbocharger 160 may compress air before the air reaches the intake manifold 110.

A wastegate 164 may allow exhaust gas to bypass the turbocharger 160, thereby reducing the turbocharger's output (or boost). The control module 114 controls the turbocharger 160 via a boost actuator module 162. The boost actuator module 162 may modulate the boost of the turbocharger 160 by controlling the position of the wastegate 164. The compressed air charge is provided to the intake manifold 110 by the turbocharger 160. An intercooler (not shown) may dissipate some of the compressed air charge's heat, which is generated when air is compressed and may also be increased by proximity to the exhaust system 134. Alternate engine systems may include a supercharger that provides compressed air to the intake manifold 110 and is driven by the crankshaft.

The engine system 100 may include an exhaust gas recirculation (EGR) valve 170, which selectively redirects exhaust gas back to the intake manifold 110. In various implementations, the EGR valve 170 may be located after the turbocharger 160. The engine system 100 may measure the speed of the crankshaft in revolutions per minute (RPM) using an engine speed sensor 180. The temperature of the engine coolant may be measured using an engine coolant temperature (ECT) sensor 182. The ECT sensor 182 may be located within the engine 105 or at other locations where the coolant is circulated, such as a radiator (not shown).

The pressure within the intake manifold 110 may be measured using a manifold absolute pressure (MAP) sensor 184. In various implementations, engine vacuum may be measured, where engine vacuum is the difference between ambient air pressure and the pressure within the intake manifold 110. The mass of air flowing into the intake manifold 110 may be measured using a mass air flow (MAF) sensor 186. The MAF sensor 186 may be located in a housing that includes the throttle valve 112.

The throttle actuator module 116 may monitor the position of the throttle valve 112 using one or more throttle position sensors (TPS) 190. The ambient temperature of air being drawn into the engine system 100 may be measured using an intake air temperature (IAT) sensor 192. The control module 114 may use signals from the sensors to make control decisions for the engine system 100.

The control module 114 may communicate with a transmission control module 194 to coordinate shifting gears in a transmission (not shown). For example, the control module 114 may reduce torque during a gear shift. The control module 114 may communicate with a hybrid control module 196 to coordinate operation of the engine 105 and an electric motor 198. The electric motor 198 may also function as a generator, and may be used to produce electrical energy for use by vehicle electrical systems and/or for storage in a battery. In various implementations, the control module 114, the transmission control module 194, and the hybrid control module 196 may be integrated into one or more modules.

The combined torque of engine 105 and electric motor 198 is applied to an input of transmission 202. Transmission 202 may be an automatic transmission that switches gears in accordance with a gear change command from the control module 114. An output shaft of transmission 202 is coupled to an input of a differential gear 204. Differential gear 204 drives axles and wheels 200. Wheel speed sensors 206 generate signals that indicate a rotation speed of their respective wheels 200.

The control module 114 estimates an engine output torque to provide based on received sensor signals and other parameters described herein. The control module 114 may adjust a position of the throttle, air-fuel ratio, valve timing, fuel injection, etc. to provide the estimated engine output torque. Based on a desired engine output torque, a desired air flow, a desired fuel injection, and/or a desired spark timing is achieved. The desired engine output torque may be based on a vehicle operator (driver) request and/or may be controller based, such as a torque output request from a cruise control system. In particular, the control module 114 controls the torque output of the engine based on the coordinated torque control methods and systems of the present disclosure.

The sensor signals that are received by the control module 114 may include sensor signals from: the MAP sensor 184, the MAF sensor 186, the throttle position sensor 190, the IAT sensor 192, an accelerator pedal position sensor 195, or other sensors, such as the engine coolant temperature sensor 182, the engine speed sensor 180, an ambient temperature sensor 197, an oil temperature sensor 199, and a vehicle speed sensor 201.

The control module 114 communicates with the throttle actuator module 116. The control module 114 receives a throttle position signal from the throttle position sensor 190 and adjusts throttle position based on the throttle position signal. The control module 114 may control the throttle 112 using a throttle actuator based on a position of an accelerator pedal 193.

Air mass, volume, and pressure per cylinder may be determined and/or estimated based on signals from the sensors 184, 186. The control module 114 may adjust engine and exhaust system devices based on a desired MAP and a desired MAF. The desired MAP and MAF may be determined based on engine speed and torque request signals.

Figure 2:
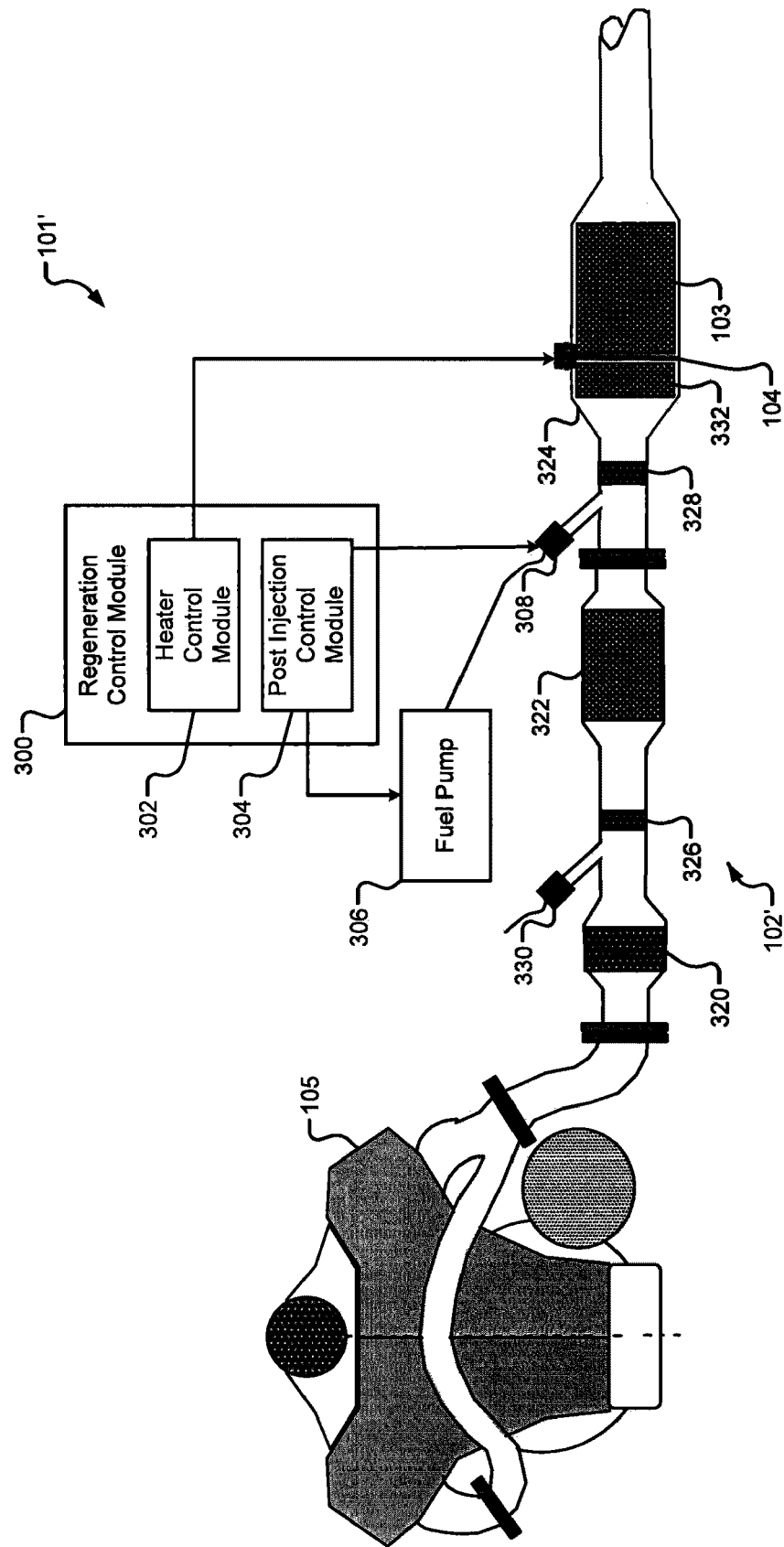
FIG. 2 is a functional diagram of a regeneration system in accordance with an embodiment of the present disclosure.

The engine system 100 may further include other sensors 218, such as exhaust flow sensors 220, an EGR sensor 222, environmental sensors 224, an oxygen sensor 226 and engine sensors 230 not mentioned above. The environmental sensors 224 may include an altitude sensor, the ambient temperature sensor 197, a barometric pressure sensor, and an air flow sensor, as shown in FIG. 2. The environmental sensors 224 may be used to determine environmental conditions, which may be further used to adjust post injection of fuel and/or to determine a desired throttle area. The desired throttle area may correspond to a specific throttle position.

The engine system 100 may also include memory 240, which may be used when performing post injection of fuel and/or when performing various functions associated with the modules of the control module 114. Example modules of the control module 114 are shown and described with respect to the embodiment of FIG. 2. The memory 240 may include various tables 242, which may include predetermined exhaust temperature values, predetermined environmental condition values, correction factors, coefficient values, etc. for post injection of fuel control. The contents of the memory 240 may be associated with one or more of the steps described with respect to the embodiment of FIG. 3.

The exhaust system 134 includes an exhaust manifold 250, the oxidation catalyst 135, and the PF 103. Optionally, an EGR valve (not shown) re-circulates a portion of the exhaust back into the intake manifold 110. The remainder of the exhaust is directed into the turbocharger 160 to drive a turbine. The turbine facilitates the compression of the fresh intake air. Exhaust flows from the turbocharger 160 through the oxidation catalyst 135 and into the PF 103. The oxidation catalyst 135 oxidizes the exhaust based on a post combustion air/fuel ratio. The amount of oxidation increases the temperature of the exhaust. The PF 103 receives exhaust from the oxidation catalyst 135 and filters any soot particulates present in the exhaust. The post injection of fuel is used to heat the soot to a regeneration temperature.

A control module 114 controls the engine and regeneration of the PF 103 based on various sensed information and soot loading. More specifically, the control module 114 estimates loading of the PF 103. When the estimated loading is at a predetermined level and/or the exhaust flow rate is within a desired range, regeneration may be enabled. The duration of the regeneration process may be varied based upon the estimated amount of particulate matter within the PF 103. Post injection of fuel may be adjusted throughout the regeneration process.

The post-injected (PI) fuel and/or post-combustion air/fuel mixture is passed to and may be oxidized by the oxidation catalyst 135, which heats the PF 103. The oxidation catalyst 135 promotes oxidation of unburned fuel and raises the temperature of the exhaust gas using heat generated by an oxidation reaction. The heat may cause soot in the PF 103 to reach a point of ignition (light-off) and thus start regeneration. The ignition of the soot creates an exotherm that propagates along the PF 103 and heats soot downstream, continuing the regeneration process. During regeneration, the soot may be ignited using post injection and/or by electrically heating elements of the heater assembly 104.

The engine system 100 may include exhaust system sensors, such as the exhaust flow sensors 220, exhaust pressure sensors 252, 254, an exhaust temperature sensor 256, etc. for determining exhaust flow levels, exhaust temperature levels, exhaust pressure levels, etc.

The PF 103 may have an associated predetermined regeneration temperature operating range, a predetermined regeneration operating temperature, and/or a predetermined peak operating temperature. The peak operating temperature may be associated with a point of potential degradation. For example, a PF may begin to breakdown at operating temperatures greater than 800° C. The peak operating temperature may vary for different PFs. The peak operating temperature may be associated with an average temperature of a portion of a PF or an average temperature of the PF as a whole.

To prevent damage to a PM filter, and increase the operating life of the PM filter, the embodiments of the present disclosure may adjust PM filter regeneration based on soot loading. A target maximum operating temperature is set for a PM filter. Regeneration is performed when soot loading is less than or equal to a soot loading level associated with the maximum operating temperature. The regeneration may be performed when soot loading levels are low or within a predetermined range. The predetermined range has an upper soot loading threshold $S_{ut}$ that is associated with the maximum operating temperature. Limiting peak operating temperatures of a PM filter minimizes pressures in and expansion of the PM filter. In one embodiment, soot loading is estimated and regeneration is performed based thereon. In another embodiment, when soot loading is greater than desired for regeneration, mitigation strategies are performed to reduce PM filter peak temperatures during regeneration.

Soot loading may be estimated and/or predicted from parameters, such as mileage, exhaust pressure, exhaust drop off pressure across a PM filter, etc. Mileage refers to vehicle mileage, which can be used to estimate vehicle engine operating time and/or the amount of exhaust gas generated. For example only, regeneration may be performed when a vehicle has traveled approximately 200-300 miles. The amount of soot generated typically depends upon the amount of vehicle loading and use over time. At idle speeds, less soot is generated than when operating at higher speeds. The amount of exhaust gas generated is related to the state of soot loading in the PM filter.

Exhaust pressure can be used to estimate the amount of exhaust generated over a period of time. Regeneration may be performed when an exhaust pressure exceeds a predetermined level. For example when exhaust pressure entering a PM filter exceeds a predetermined level, regeneration may be performed. As another example when exhaust pressure exiting a PM filter is below a predetermined level, regeneration may be performed.

Exhaust drop off pressure may be used to estimate the amount of soot in a PM filter. For example, as the drop off pressure increases the amount of soot loading increases. The exhaust drop off pressure may be determined by determining pressure of exhaust entering a PM filter minus pressure of exhaust exiting the PM filter. Exhaust system pressure sensors may be used to provide these pressures.

A predictive method may include the determination of one or more engine operating conditions, such as engine load, fueling schemes, fuel injection timing, and exhaust gas recirculation (EGR). A cumulative weighting factor may be used based on the engine conditions. The cumulative weighting factor is related to soot loading. When the cumulative weighting factor exceeds a threshold, regeneration may be performed.

Based on the estimated soot loading and a predetermined peak operating temperature for a PM filter, regeneration is performed to prevent the PM filter from operating at temperatures above the peak operating temperature.

Designing a control system to target a selected soot loading allows PM filter regenerations without intrusive controls. A robust regeneration strategy as provided herein, removes soot from a PM filter while limiting peak operating temperatures. Limiting of peak operating temperatures reduces thermal stresses on a substrate of a PM filter and thus prevents damage to the PM filter, which can be caused by high soot exotherms. As a result, durability of the PM filter is increased.

When soot loading is greater than a threshold level associated with a set peak regeneration temperature, mitigation strategies may be performed to reduce PM filter peak temperatures during regeneration. For example, when a maximum soot loading threshold is set at approximately 2 g/l and current soot loading is 4 g/l, to minimize temperatures within a PM filter during regeneration, engine operation is adjusted. The adjustment may include oxygen control and exhaust flow control.

Soot loading may be greater than an upper threshold level, for example, when an engine is operated to receive a high intake air flow rate for an extended period of time. Such operation may occur on a long freeway entrance ramp or during acceleration on a freeway. As another example, a soot loading upper threshold may be exceeded when a throttle valve of an engine is continuously actuated between full ON and full OFF for an extended period of time. High air flow rates can prevent or limit regeneration of a PM filter.

During oxygen control, the amount of oxygen entering the PM filter is decreased to decrease the exotherm temperatures of the PM filter during regeneration. To decrease oxygen levels airflow may be decreased, EGR may be increased, and/or fuel injection may be increased. The fuel injection may be increased within engine cylinders and/or into the associated exhaust system. The burning of more fuel decreases the amount of oxygen present in the exhaust system.

A large increase in exhaust flow can aid in distinguishing or minimizing an exothermic reaction in a PM filter. Exhaust flow control may include an increase in exhaust flow by a downshift in a transmission or by an increase in idle speed. The increase in engine speed increases the amount of exhaust flow.

Referring now to FIG. 2, a regeneration system 101' and corresponding exhaust system 102' of the engine 105 is shown. The regeneration system 101' includes a regeneration control module 300, which may be part of the control module 114 of FIG. 1. The regeneration control module 300 includes a heater control module 302 and a post injection control module 304. The heater control module 302 controls operation of the heater assembly 104. The post injection control module 304 may control operation of a fuel pump 306 and/or a fuel injector 308 for direct injection of fuel into the exhaust system 102'. The post injection control module 304 may also or alternatively control the post injection of fuel into cylinders of the engine 105.

The exhaust system 102' includes a first DOC 320, a selective catalytic reduction (SCR) device 322 and a PF assembly 324. The SCR device 322 is located downstream from the first DOC 320. The PF assembly 324 is located downstream from the SCR device 322. A first set of mixers 326 may be located between the first DOC 320 and the SCR device 322. A second set of mixers 328 may be located between the SCR device 322 and the PF assembly 324.

The exhaust system 102' may include a urea system that includes a urea injector 330. The urea injector 330 may inject urea directly into the exhaust system 102, for example, between the first DOC 320 and the first set of mixers 326, as shown. The exhaust system 102' may also include a fuel injector 308 for post fuel injection. The fuel injector 308 may inject fuel directly into the exhaust system 102', such as between the SCR device 322 and the second set of mixers 328, as shown.

The PF assembly 324 may include a second DOC 332, the heater assembly 104 and the PF 103. The heater assembly 104 is located downstream from the second DOC 332. The PF 103 is located downstream from the heater assembly 104.

Figure 3:
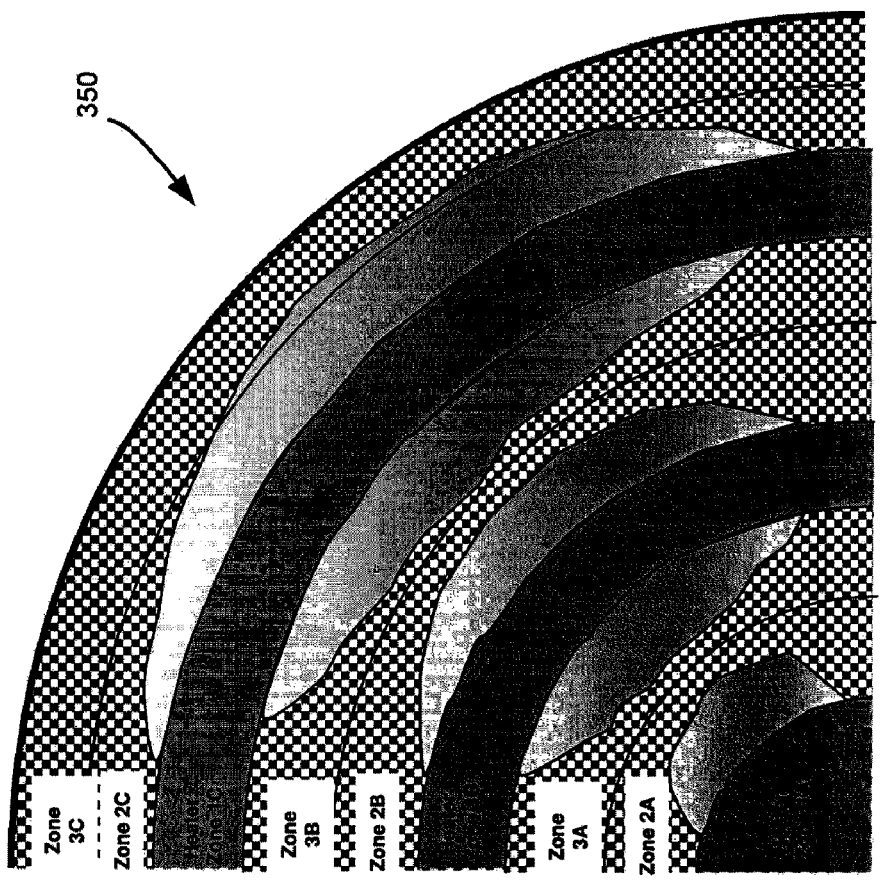
FIG. 3 illustrates exemplary zoning of a zoned inlet heater.

Referring now to FIG. 3, an exemplary zoned inlet heater 350 for the PF assembly 324 is shown. The electrically heated PF assembly 324 is arranged spaced from or in contact with the PF assembly 324. The PF assembly 324 includes multiple spaced heater zones including zone 1 (with sub-zones 1A, 1B and 1C), zone 2 (with sub-zones 2A, 2B and 2C) and zone 3 (with sub-zones 3A, 3B and 3C). The zones 1, 2 and 3 may be activated during different respective periods.

As exhaust gas flows through the activated zones of the heater, regeneration occurs in the corresponding portions of the PF that initially received the heated exhaust gas (e.g. areas downstream from the activated zones) or downstream areas that are ignited by cascading burning soot. The corresponding portions of the PF that are not downstream from an activated zone act as stress mitigation zones. For example in FIG. 2, sub-zones 1A, 1B and 1C are activated and sub-zones 2A, 2B, 2C, 3A, 3B, and 3C act as stress mitigation zones.

The corresponding portions of the PF downstream from the active heater sub-zones 1A, 1B and 1C thermally expand and contract during heating and cooling. The stress mitigation sub-zones 2A and 3A, 2B and 3B, and 2C and 3C mitigate stress caused by the expansion and contraction of the heater sub-zones 1A, 1B and 1C. After zone 1 has completed regeneration, zone 2 can be activated and zones 1 and 3 act as stress mitigation zones. After zone 2 has completed regeneration, zone 3 can be activated and zones 1 and 2 act as stress mitigation zones.

Figure 4:
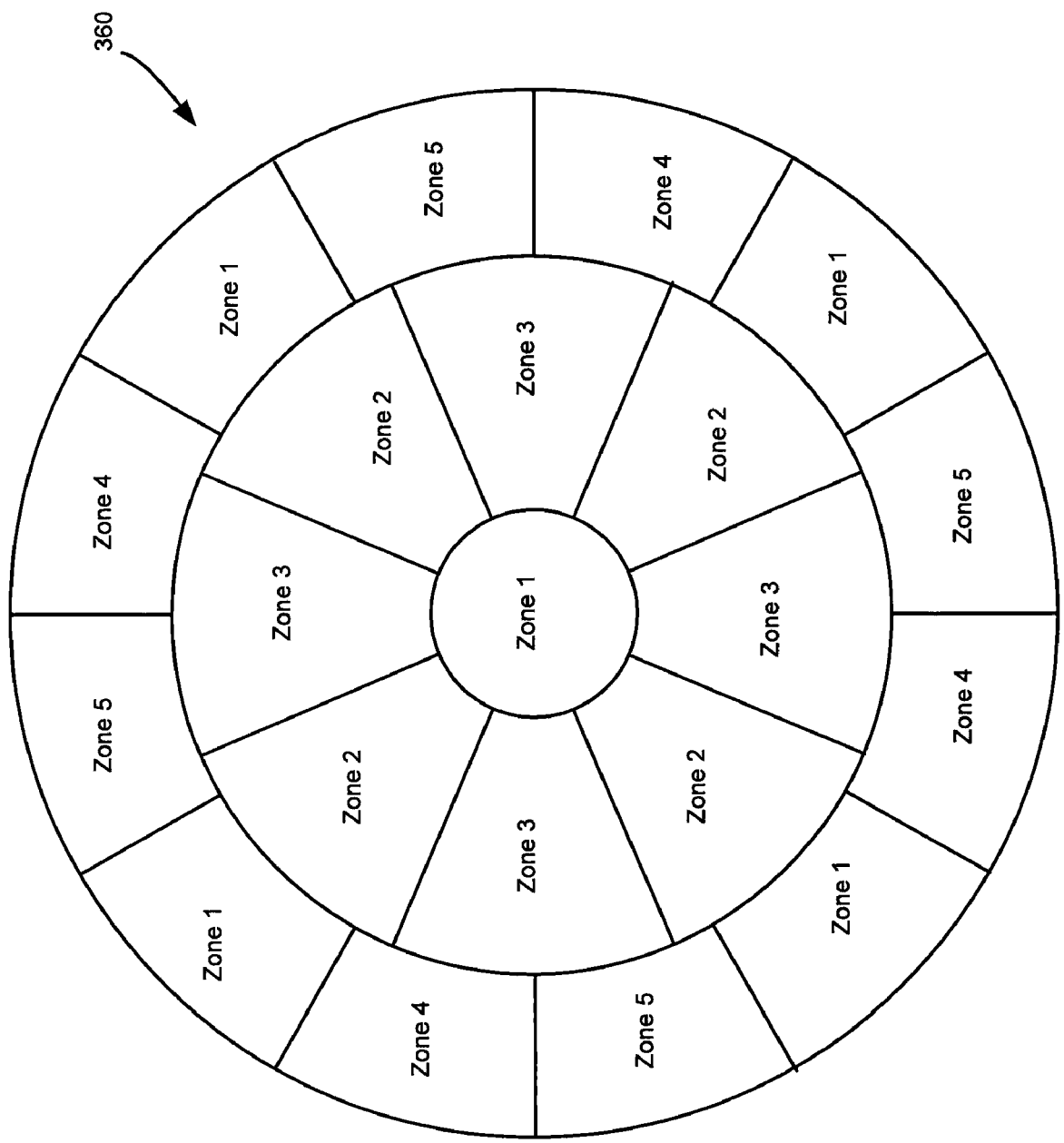
FIG. 4 illustrates exemplary zoning of a zoned inlet heater.

Referring now to FIG. 4, another exemplary zoned inlet heater 360 is shown. A center portion may be surrounded by a middle zone including a first circumferential band of zones. The middle portion may be surrounded by an outer portion including a second circumferential band of zones.

In this example, the center portion includes zone 1. The first circumferential band of zones includes zones 2 and 3. The second circumferential band of zones comprises zones 1, 4 and 5. As with the embodiment described above, downstream portions from active zones are regenerated while downstream portions from inactive zones provide stress mitigation. As can be appreciated, one of the zones 1, 2, 3, 4 and 5 can be activated at a time. Others of the zones remain inactivated.

Figure 5:
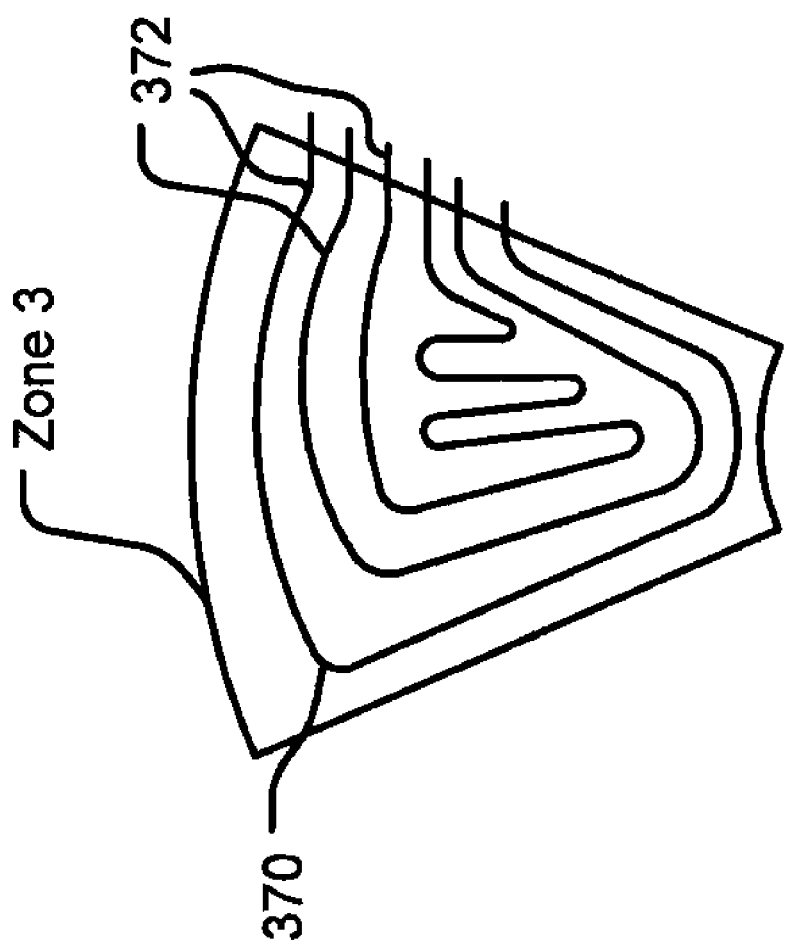
FIG. 5 illustrates an exemplary resistive heater in one of the zones of the zoned inlet heater of FIG. 4.

Referring now to FIG. 5, an exemplary resistive heater 370 arranged adjacent to one of the zones (e.g. zone 3) from the first circumferential band of zones in FIG. 4 is shown. The resistive heater 370 may comprise one or more coils, heater segments, or conductive elements that cover the respective zone to provide sufficient heating. The resistive heater 370, as shown, includes three (3) heater segments 372, which are electrically conductive.

Figure 6:
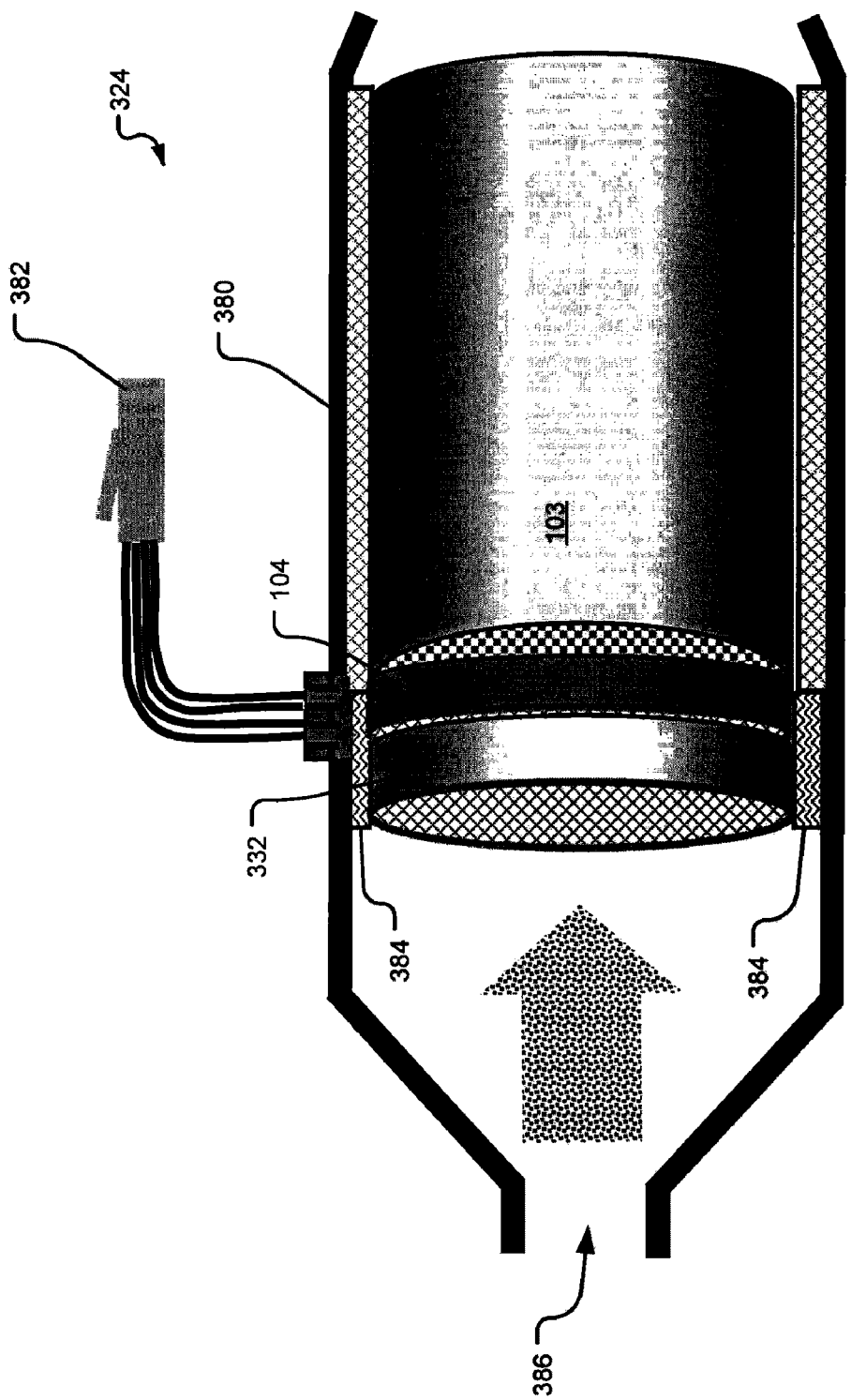
FIG. 6 illustrates the electrically heated PM filter.

Referring now to FIG. 6, the PF assembly 324 is shown in further detail. The PF assembly 324 includes a housing 380, the PF 103, the zoned heater 104, and the second DOC 332. The zoned heater 104 may be arranged between a laminar flow element or the second DOC 332 and a substrate of the PF 103. An electrical connector 382 may provide current to the zones of the PF assembly 324 as described above.

As can be appreciated, the zoned heater 104 may be in contact with or spaced from the PF 103 such that the heating is convection and/or conduction heating. Insulation 384 may be arranged between the zoned heater 104 and the housing 380. Exhaust gas enters the PF assembly 324 from an upstream inlet 386 and is heated by one or more zones of the PF assembly 324. The heated exhaust gas is received by the PF 103.

Figure 7:
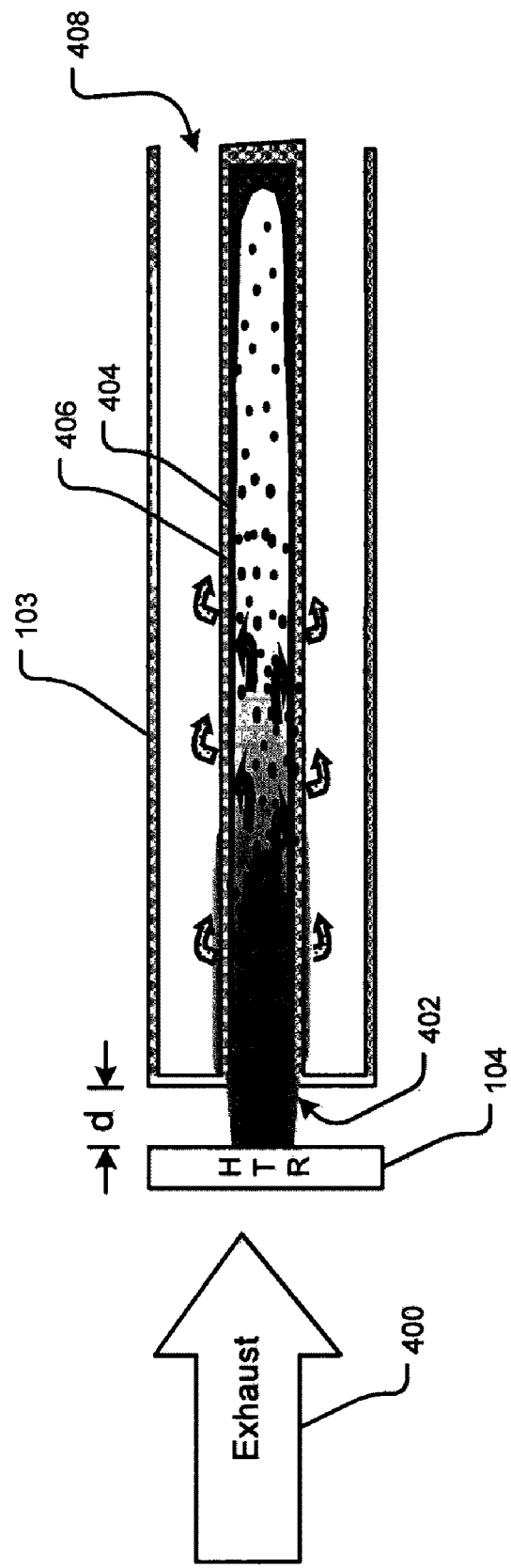
FIG. 7 illustrates heating within a portion of a particulate filter.

Referring now to FIG. 7, heating within the PF assembly 324 is shown in further detail. Exhaust gas 400 passes through the heater 104 and is heated by one or more zones of the heater 104. If spaced from the filter 103, the heated exhaust gas travels a distance "d" and is then received by the filter 103. For example only, the distance "d" may be ½" or less. The filter 103 may have a central inlet 402, a channel 404, filter material 406 and an outlet 408 located radially outside of the inlet. The filter may be catalyzed. The heated exhaust gas causes PM in the filter to burn, which regenerates the PM filter. The heater 104 transfers heat by convection and/or conduction to ignite a front portion of the filter 103. When the soot in the front face portions reaches a sufficiently high temperature, the heater 104 is turned off. Combustion of soot then cascades down a filter channel 404 without requiring power to be maintained to the heater 104.

Figure 8:
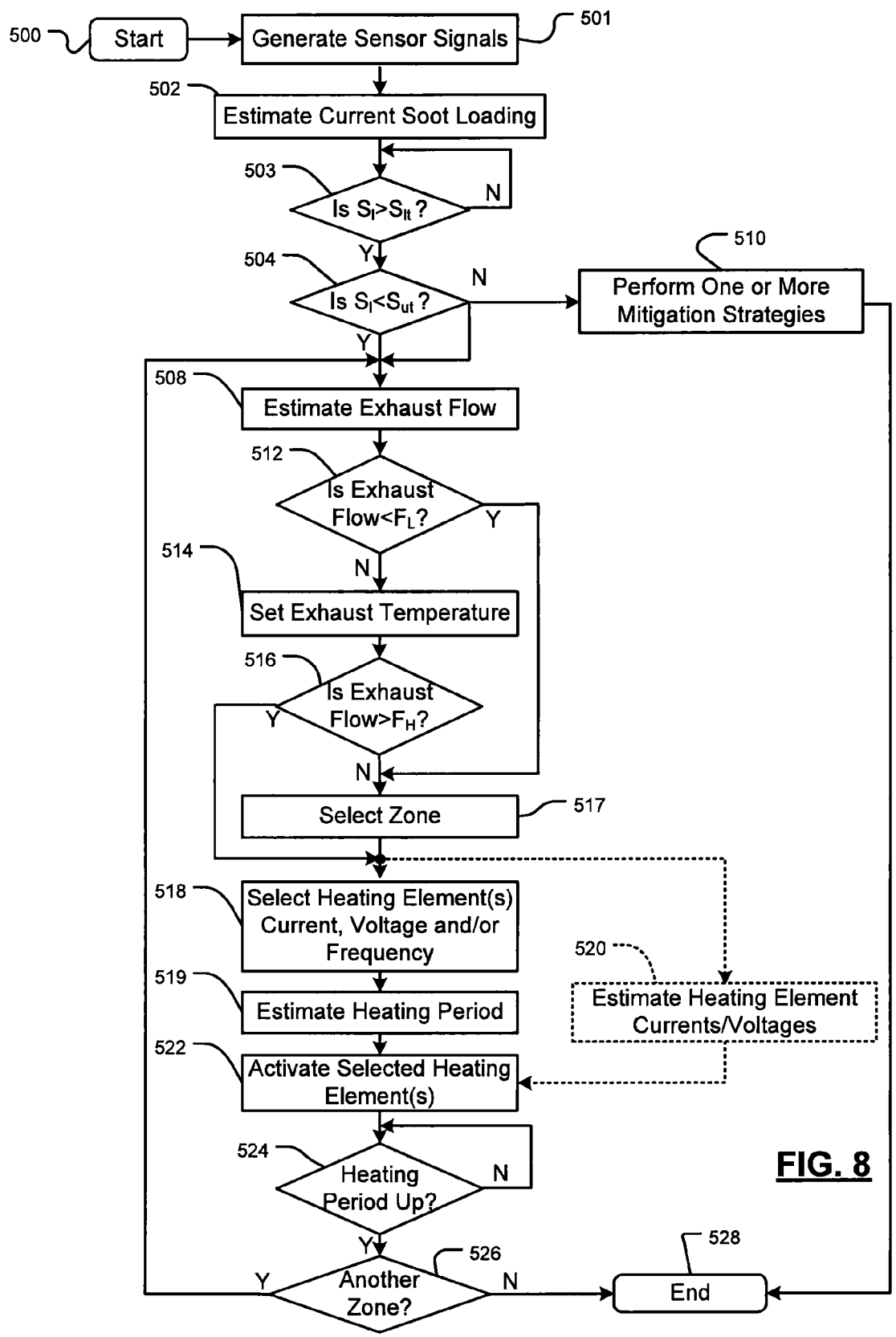
FIG. 8 illustrates a regeneration method in accordance with an embodiment of the present disclosure.

Referring now to FIG. 8, a regeneration method is shown. Although the following steps are primarily described with respect to the embodiments of FIGS. 1-2, the steps may be easily modified to apply to other embodiments of the present disclosure.

In step 500, control of a control module, such as the control module 114 of FIG. 1, begins and proceeds to step 501. In step 501, sensor signals are generated. The sensor signals may include exhaust flow rate signals, exhaust temperature signals, exhaust pressure signals, an oxygen signal, an intake air flow signal, an intake air pressure signal, an intake air temperature signal, an engine speed signal, an EGR signal, etc., which may be generated by the above-described sensors. The sensor information may be updated throughout this method and the regeneration process and may be detected and/or indirectly estimated.

In step 502, control estimates current soot loading $S_I$ of the PF. Control may estimate soot loading as described above. The estimation may be based on the sensor information, vehicle mileage, exhaust pressures, exhaust drop off pressures across the PM filter, and/or a predictive method. The predictive method may include estimation based on one or more engine operating parameters, such as engine load, fueling schemes, fuel injection timing, and EGR. In step 503, control determines whether the current soot loading $S_I$ is greater than a soot loading lower threshold $S_{lt}$. When the current soot loading $S_I$ is greater than the lower threshold $S_{lt}$ control proceeds to step 504, otherwise control returns to step 502.

In step 504, control determines if regeneration is to be performed based on whether current soot loading $S_I$ is less than a soot loading upper threshold $S_{ut}$. When the current soot loading $S_I$ is less than the upper threshold $S_{ut}$ then control proceeds to step 508. When the current soot loading $S_I$ is greater than or equal to the upper threshold $S_{ut}$ then control proceeds to step 510. A soot loading model may be used when determining when to perform regeneration. The soot loading model may be used when performing one or more of steps 502-504. In step 510, control performs mitigation strategies as described above to limit peak temperatures in the PF during regeneration. Step 510 is performed while performing regeneration steps 512-524.

If control determines that regeneration is needed in step 504, control estimates exhaust flow. Exhaust flow may be directly measured, indirectly estimated, and/or predicted based on history data. The exhaust flow when directly detected may be based on signals from, for example, the exhaust flow sensor 220 of FIG. 1. History data may refer to driving history. An exhaust flow range of operation may be determined based on the determined exhaust flow. The exhaust flow range may have an upper bound and a lower bound. The exhaust flow and exhaust flow range may be based on vehicle speed and braking (axle braking, engine braking, transmission braking, etc.). For example, when a vehicle is operating at slow speeds in city traffic with a significant amount of braking, exhaust flow is slower than when the vehicle is operating at increased speeds, on a freeway, with minimal braking. An exhaust flow prediction model may be used to predict the exhaust flow and/or exhaust flow operating range based on the history data, which may include vehicle speed data, braking data, etc.

In step 512, when the exhaust flow is less than a first predetermine flow rate FL, control proceeds to step 514, otherwise control proceeds to step 517. In step 514, control adjusts the temperature of the exhaust via post fuel injection. A post fuel injection technique described above may be used to increase the temperature of the exhaust. The exhaust temperature may be adjusted based on the exhaust flow determined in step 508. Fuel may be injected directly into the exhaust or into a cylinder of the engine and exhausted from the engine.

In step 516, when the exhaust flow is greater than a second predetermined flow rate $F_H$, control proceeds to step 528 and ends, otherwise control proceeds to step 517. In step 517, control selects one or more zones of the PF to heat.

In step 518, control selects heating element(s) associated with the selected zones. Control may also select current, voltage and/or frequencies of signals to apply to the heating elements. The current, voltage and frequencies may be predetermined and stored in a memory, determined via a look-up table, or determined based on engine operating parameters, some of which are stated herein. The current, voltage and/or frequencies may be based on the sensor information obtained in step 501 and the current soot loading.

In step 519, control estimates a heating period sufficient to achieve a minimum soot temperature. The minimum soot temperature may be based on at least one of current, voltage, exhaust flow, exhaust temperature and predetermined heating element circuit characteristics, such as heating element length, width, coverage area, heating output, etc.

The minimum soot temperature should be sufficient to start the soot burning and to create a cascade effect. For example only, the minimum soot temperature may be set to 700 degrees Celsius or greater. In an alternate step 520 to step 518, control estimates heating element current, voltage and/or frequencies to achieve minimum soot temperatures based on a predetermined heating period, exhaust flows and/or exhaust temperatures.

In step 522, the PF is regenerated by selectively heating one or more of the zones and igniting the soot in the portions of the PF associated with the zones. When soot within the selected zones reaches a regeneration temperature, the selected heating elements may be turned off and the burning soot then cascades down the PF, which is similar to a burning fuse on a firework. In other words, the heating elements may be activated long enough to start the soot ignition and may then be deactivated or may be activated throughout the soot burning process.

In one embodiment, radially outer most zones are regenerated first followed by radially inner zones. The zones may be regenerated in a select, predetermined, sequential, independent, or arbitrary manner. Multiple zones may be selected and heated during the same time period.

In step 524, control determines whether the heating period is up. If step 524 is true, control determines whether additional zones need to be regenerated in step 526. If step 526 is true, control returns to step 508.

The burning soot is the fuel that continues the regeneration. This process is continued for each heating zone until the PF is completely regenerated. Control ends in step 528.

Thus, in the above steps, control operates in at least three modes. In a first mode, when the exhaust flow is low, a heater assembly is used to heat the PF. Control may refrain from using exhaust heating techniques during the first mode. In a second mode, when the exhaust flow is within a predetermined range, such when the exhaust flow is between the predetermined flow rates $F_L$ and $F_H$, both a heater and exhaust heating or post fuel injection is used. By using exhaust heating, the heater operating range is extended or the flow rate range in which the heater may be used is increased. Since the exhaust is heated, the heater may be used at increased flow rates. In a third mode, when the exhaust flow rate is high, exhaust heating or post fuel injection is used. The third mode is performed when driving conditions are more demanding (increased vehicle speeds). When the exhaust flow rates are high, control may default to the third mode. In the third mode the heater may be deactivated.

The above-described steps are meant to be illustrative examples; the steps may be performed sequentially, synchronously, simultaneously, continuously, during overlapping time periods or in a different order depending upon the application.

In use, the control module determines when the PF requires regeneration. The determination is based on soot levels within the PF. Alternately, regeneration can be performed periodically or on an event basis. The control module may estimate when the entire PF needs regeneration or when zones within the PF need regeneration. When the control module determines that the entire PF needs regeneration, the control module sequentially activates one or more of the zones at a time to initiate regeneration within the associated downstream portion of the PF. After the zone or zones are regenerated, one or more other zones are activated while the others are deactivated. This approach continues until all of the zones have been activated. When the control module determines that one of the zones needs regeneration, the control module activates the zone corresponding to the associated downstream portion of the PM filter needing regeneration.

The above-described techniques perform regeneration for a wide range of exhaust flow rates. The use of both an electrically heated PF and exhaust heating techniques efficiently cleans a PF with the least amount of fuel. This allows a PF to be regenerated at a wide range of exhaust flow rates and maximizes the operating range of an electrically heated PF for improved fuel efficiency.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system comprising:
   a particulate matter (PM) filter that includes a plurality of zones;
   an electrical heater that includes a plurality of heater segments that are associated with respective ones of the zones,
   wherein the electrical heater is arranged upstream from and proximate with the PM filter;
   a post-injection system that injects fuel into at least one of a cylinder of an engine and an exhaust system; and
   a control module that is configured to operate in a first mode that includes activating the electrical heater to heat exhaust of the engine and to operate in a second mode that includes activating the post-injection system to heat the exhaust,
   wherein the control module determines a flow rate of the exhaust and selectively operates in at least one of the first mode and the second mode based on the flow rate.

2. The system of claim 1 wherein the control module operates in the first mode when the flow rate of the exhaust is less than a predetermined rate.

3. The system of claim 2 further comprising a flow rate sensor that detects the flow rate.

4. The system of claim 2 wherein the control module refrains from activating the post-injection system when the flow rate is less than the predetermined rate.

5. The system of claim 1 wherein the control module activates the electrical heater and the post-injection system when flow rate of the exhaust is greater than a first predetermined rate and less than a second predetermined rate.

6. The system of claim 1 wherein the control module operates in the second mode when flow rate of the exhaust is greater than a predetermined rate.

7. The system of claim 6 wherein the control module refrains from activating the electrical heater when the flow rate of the exhaust is greater than the predetermined rate.

8. The system of claim 1 wherein the control module selectively activates at least one of the electrical heater and the post-injection system based on soot loading of the PM filter.

9. A system comprising:
   a particulate matter (PM) filter that includes a plurality of zones;
   an electrical heater that includes a plurality of heater segments that are associated with respective ones of the zones,
   wherein the electrical heater is arranged upstream from and proximate with the PM filter;
   a post-injection system that injects fuel into at least one of a cylinder of an engine and an exhaust system; and
   a control module that is configured to operate in a first mode that includes activating the electrical heater to heat exhaust of the engine and to operate in a second mode that includes activating the post-injection system to heat the exhaust,
   wherein the control module selectively operates in the first mode, the second mode and a third mode,
   wherein the first mode includes activating the electrical heater and refraining from activating the post-injection system,
   wherein the control module operates in the first mode when the flow rate is less than or equal to a first predetermined rate,
   wherein the third mode includes activating the electrical heater and the post-injection system,
   wherein the control module operates in the third mode when the flow rate is greater than the first predetermined rate and less than or equal to a second predetermined rate,
   wherein the second mode includes activating the post-injection system and refraining from activating the electrical heater, and
   wherein the control module operates in the second mode when the flow rate is greater than the second predetermined rate.

10. The system of claim 1 wherein the control module activates the post-injection system when the flow rate of the exhaust is greater than a first predetermined rate and then activates the electrical heater when the flow rate is less than or equal to a second predetermined rate.

11. A method comprising:
    providing a particulate matter (PM) filter that includes a plurality of zones;
    providing a regeneration system that is configured to operate in a first mode that includes activating an electrical heater to heat exhaust of an engine and in a second mode that includes activating a post-injection system to heat the exhaust;
    arranging the electrical heater that includes a plurality of heater segments that are associated with respective ones of the zones, upstream from and proximate with the PM filter;
    determining a flow rate of the exhaust; and
    heating exhaust of the engine by selectively operating the regeneration system in at least one of the first mode and the second mode based on the flow rate.

12. The method of claim 11 comprising operating in the first mode when the flow rate of the exhaust is less than a predetermined rate.

13. The method of claim 12 comprising operating in the first mode when the flow rate of the exhaust is less than a predetermined rate.

14. The method of claim 12 further comprising refraining from activating the post-injection system when the flow rate is less than the predetermined rate.

15. The method of claim 11 further comprising:
    operating in the second mode when flow rate of the exhaust is greater than a predetermined rate; and refraining from activating the electrical heater when the flow rate of the exhaust is greater than the predetermined rate.

16. The method of claim 15 further comprising refraining from activating the electrical heater when the flow rate of the exhaust is greater than a predetermined rate.

17. The method of claim 11 further comprising selectively operating in the first mode, the second mode and a third mode,
   operating in the first mode when the flow rate is less than or equal to a first predetermined rate,
   operating in the third mode when the flow rate is greater than the first predetermined rate and less than or equal to a second predetermined rate, and
   operating in the second mode when the flow rate is greater than the third predetermined rate,
   wherein the first mode includes activating the electrical heater and refraining from activating the post-injection system,
   wherein the third mode includes activating the electrical heater and the post-injection system, and
   wherein the second mode includes activating the post-injection system and refraining from activating the electrical heater.

18. The method of claim 11 comprising:
   activating the post-injection system when the flow rate of the exhaust is greater than a first predetermined rate; and then
   activates the electrical heater when the flow rate is less than or equal to a second predetermined rate.

19. The system of claim 1 wherein the control module determines whether to operate in each of the first mode and the second mode based on the flow rate.

20. The system of claim 19 wherein the control module operates in:
   the first mode when the flow rate is within a first range; and
   the second mode when the flow rate is within a second range,
   the second range is different than the first range and includes flow rates in the first range.

* * * * *